Thomas W. Holland
INVENTOR

C. A. Phillips

Thomas W. Holland
INVENTOR

C. A. Phillips

Thomas W. Holland
INVENTOR
C. A. Phillips

United States Patent Office 3,376,564
Patented Apr. 2, 1968

3,376,564
MEANS TO UTILIZE A CONDUCTIVE STRIP ON A MAGNETIC TAPE AS AN INDEXING DEVICE

Thomas W. Holland, Redstone Arsenal, Ala.
(322 Robin Hill Drive, Altamonte Springs, Fla. 32701)
Filed Apr. 13, 1964, Ser. No. 359,161
10 Claims. (Cl. 340—174.1)

ABSTRACT OF THE DISCLOSURE

A system to be used with a tape recording and playback machine for automatically and precisely locating any previously marked portion of a tape and causing replay of that portion of the tape and for automatically locating and playing any number of previously selected locations in any order desired. Coded metallic strips, one representative of each number, are placed on the back side of a tape. These are applied in numerical order from the beginning of the tape. The strips are detected by a device consisting of conductive posts positioned to contact certain portions of the coded strips. Comparison circuitry converts the detected coded patterns to decimal form, each comparison means representing one number and therefore one portion of the tape. Switching means cause each detected number to be classed into one of three groups with respect to the desired number to be located: numbers smaller in value than the desired number, numbers larger in value than the desired number, and the correct number. Detection of a number in the first two groups causes the tape machine to respond in the direction of the correct number. Detection of the correct number causes a sequence of operations designed to precisely reproduce the desired portion. A sequencing or stepping switch allows preselecting on a number of selector switches any sequence of numbers to be located. After initiation each selection will be located and played automatically in the preset sequence without further attention.

This invention relates to tape recording and reproduction systems and particularly to means for selectively locating and reproducing tape recorded information.

In the past decade the growth of electrical recording on tape, particularly magnetic tape, has been phenomenal. With presently available tape equipment it is possible to provide continuous recordings ranging from a few minutes to many hours. Considering the field of musical recordings this means, for example, that on a 45 minute tape approximately 15 three minute selections may be provided. While this is certainly a convenience there is the attendant disadvantage that frequently one is not interested in hearing all the recorded selections, nor in the order in which they appear. The problem is more acute in commercial operations, as for example in television and broadcast station applications. There is simply no equipment presently available to adequately and at a reasonable cost function with tape machines to automatically locate selections or selected locations on a tape recording.

It is accordingly an objective of this invention to provide a relatively inexpensive means for locating selected points on a tape recording and providing electrical signals adapted to control tape equipment in the automatic location and reproduction of selected portions of tape.

In accordance with this invention each selection, or other bit of recorded information, is coded by a binary system of coding. Assuming the highest number needed (the maximum number of selections on a tape) is 15, than 4 binary positions representing the presence or absence of 1, 2, 4 and/or 8 are provided.

This is uniquely done by a conductive strip included in or attached to the tape opposite the beginning of each selection and wherein successive portions (separated by dead spaces) on the strip are allocated for these numbers. For example, the presence of a number is indicated by a conductive (electrically) portion and the absence of a number is indicated by an insulated portion. Thus, for the number 10 (e.g. selection number 10) the one and four positions would be insulated and the two and eight number positions would be conductive.

Further, in accordance with the invention detection means are provided for sensing the presence or absence of each binary number so represented. The output of the detection means is fed to a comparison means wherein an output is generated whenever the binary output coincides with a preset number, e.g. the digit ten just mentioned. The comparison means in one embodiment of the invention is programmed in accordance with any desired digit within the limits of the system. The output of the comparison means then provides an output upon the occurrence of coincidence between the sensed and programmed digit or selection. This output is then employed as a control signal to control one or more tape recorder functions, as for example to control a relay which turns off a tape transport motor. In this manner, for example, a tape machine can be automatically stopped at approximately the beginning of a recorded selection which has been appropriately coded.

The invention as thus far described provides a means for location of single selections. However, in accordance with one feature of the invention means are provided for locating in sequence as many of the selections, within the limits of the binary system in use, as one desires.

As a further feature of the invention means are provided for selectively locating any of the selections on a tape in random order. Thus selection five can be located for play prior to selection two.

Still further in accordance with the invention means are provided which may be employed with any of the above described systems to precisely locate and automatically play selections.

Other objects, features and advantages of the invention will be appreciated from the following description when considered in conjunction with the accompanying drawings in which.

Figures 1, 2, 3, 4, 5:
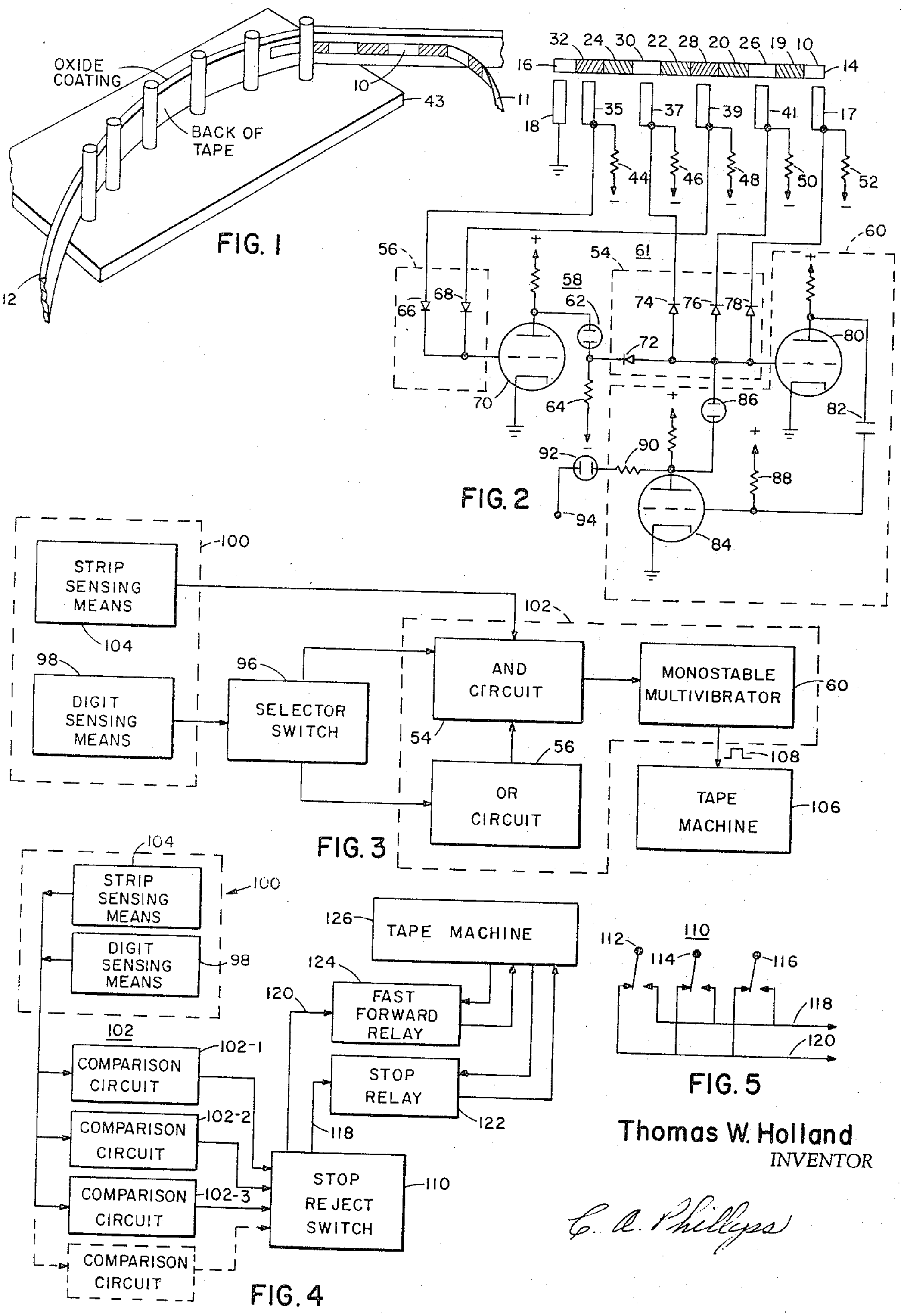
FIGURE 1 is a pictorial illustration which shows an embodiment of binary coding applied to a piece of magnetic tape and binary coding detection means as contemplated by the invention.
FIGURE 2 is a schematic illustration of the coded tape and detection means of FIGURE 1 together with basic circuit means for detecting the code applied to the tape:
tape.
FIGURE 3 is a block diagram of an embodiment of the invention similar to that shown in FIGURE 2, the difference being that a selective switch has been added to allow selective responsiveness to different digits coded on a tape.
FIGURE 4 is a block diagram of another embodiment of the invention providing means for sequentially locating selected tape portions.
FIGURE 5 is a schematic circuit diagram of a portion of FIGURE 4.

Considering first, FIGURES 1 and 2, a flexible strip 10 of conductive material such as a metal (non-magnetic) foil is attached, as with an adhesive backing 11, to a point on a portion of magnetic recording tape 12 corresponding to a position to be relocated. By way of example, such a point will be described hereinafter as being at the beginning of a musical selection, an item commonly recorded on magnetic tape. Strip 10 has some portions which are coated as with a lacquer and some portions which are exposed. Right-end portion 14, and left-end portion 16 are narrower than other portions, and are always exposed. They function together with contact posts 17 and 18 in such a manner that portion 14 must be contacting post 17 and portion 16 must be contacting post 18 before there can be any read-out of information from strip 10. Strip 10 is so constructed that staggered or alternate portions 19, 20, 22, and 24 are always lacquered, and thus insulated. They are unbalanced in arrangement with coded portions 26, 28, 30, and 32 in order that a reversal of the strip produce no faulty read-out all sensed outputs would be lacquered, representing the digit zero, which is not used to denote a selection. Posts 18 and 35 are separated by a distance equal to the width of each of the portions of strip 10 other than portions 14 and 16. Posts 35, 37, 39, 41, and 17 are separated by a distance equal to twice the spacing of posts 18 and 35. This construction requires that if post 18 contacts the left edge of portion 16 at the same instant that post 17 contacts the right edge of portion 14 the other four posts will be aligned in the center of their respective portions of strip 10. This is the condition shown and representative of the instant during which a strip must be read. To insure reading only at this time, electrical ground, or zero potential is applied to strip 10 through post 18 to post 17.

The ground potential at post 17 serves as a gating voltage for the circuit shown. If the strip is too far to the right, post 18 will not contact portion 16; if the strip is too far to the left, post 17 will not contact portion 14. This will prevent reading at the wrong time. Portions 14 and 16 are only three-fourths as wide as the other portions to insure that the reading posts are located near the center of their respective portions of the strip when they are to read to insure that accurate reading occurs. Strip 10 is so marked that if inverted with portion 14 on the left and portion 16 on the right, each of the reading posts will be the center of a permanently lacquered portion of the strip, as previously discussed, to prevent read-out. This feature allows separate coding for each track of a two-track recording.

Binary codes are assigned as follows:

An exposed portion 32 stands for the digit 8, an exposed portion 30 stands for the digit 4, an exposed portion 28 stands for 2 and an exposed portion 26 stands for a 1 to provide as a sum all combinations of one through 15 (as when any one of these portions is coated or insulated it represents a zero). It is of course obvious, that an additional coded portion or additional coded portions may be added to increase the range of binary coding. For purposes of illustration only, in discussion of the various aspects of this invention, coded tapes having fifteen bits or selections of information are contemplated. Coded strip 10 is applied to the back (uncoated side) of the tape and thus does not interfere electrically with reproduction.

As will be observed, contact post 35 always is employed to sense an eight, post 37 a four, post 39 a two, and post 41 a one. A negative voltage is applied to each of posts 35, 37, 39, 41 and 17 through resistors 44, 46, 48, 50 and 52, respectively. Thus, this is the binary zero voltage. When, however, the strip is in position for reading, post 17 is grounded and when any post engages an exposed portion it is grounded also to indicate a binary 1 condition, that is one of the digits, one, two, four, or eight has occurred. The contact posts are mounted as illustrated in FIGURE 1, on an insulated support member 43, and define a tape path; they would be appropriately positioned upon a tape recorder, tape transport, or tape playback mechanism to engage a tape in the manner illustrated. The coding illustrated is such that lacquer portion 32 represents a zero, exposed portion 30 a four, lacquered portion 28 a zero, and exposed portion 26 a one, to read out a digit five.

With the digit five appearing on strip 10, a negative potential is applied to post 35, post 37 is grounded, a negative voltage appears on post 39 and post 41 is grounded.

The circuitry to which the output of the sensing posts is applied consists basically of "and" circuit 54, "or" circuit 56, inverter stage 58 and monostable multi-vibrator circuit 60. The composite circuit which will be referred to as a coincidence or comparison circuit 61, is interconnected between the sensing posts in accordance with the binary represented number to be detected. The rule of interconnection is that all posts which should read a binary one are connected to "and" circuit 54 and all posts which should read a binary zero are connected to "or" circuit 56. The output of "or" circuit 56 is inverted by inverter stage 58 and applied through isolating neon tube 62 to an "and" input of "and" circuit 54. To this same "and" input is applied a negative potential through resistor 64, serving the same bias function as resistor 44. The total arrangement is such that all inputs to the "and" circuit must be ground or positive and all inputs to the "or" circuit must be negative for comparison circuit 61 to provide an output. "Or" circuit 56 consists of diodes 66 and 68 wherein the cathodes are connected together to the grid of triode 70 of inverter circuit 58 and the anodes to posts 35 and 39, respectively. "And" circuit 54 consists of diodes 72, 74, 76, and 78, wherein the cathode of diode 72 is connected to neon 62, the cathode of diode 74 is connected to post 37, the cathode of diode 76 is connected to post 41 and the cathode of diode 78 is connected to post 17. With this intercoupling the logic is that ground input from post 17 to "and" circuit 54 indicates circuit readiness, that "or" circuit 56 input indicates that digits two and eight are to be disregarded, and the "and" circuit inputs from posts 37, 41, and "or" circuit 56 indicate the ground inputs from posts 37 and 41, or the one and four digits are to be read.

With ground inputs to all of the diodes of "and" circuit 54 (negative inputs to "or" circuit 56 having been inverted by inverter circuit 58) the grid of triode 80 of multivibrator 60 rises in a positive direction. If any one of the inputs had been negative it would have prevented this from occurring. With both of the inputs to "or" circuit 56 being negative the grid of triode 70 of inverter 58 is negative through the reverse resistance of diodes 66 and 68 of circuit 56. The anode of triode 70 will be made positive and this voltage will be coupled through neon tube 62 to diode 72. If either of the inputs to triode 70 had been grounded the anode of tube 70 would be grounded through that diode. The anode of triode 70 would have then become more negative and this would have been coupled to diode 72 through neon tube 62. This negative input to diode 72 would have held the grid of tube 80 negative and prevented multivibrator 60 from being triggered and prevented any readout from tape 10.

With all inputs satisfied, the grid of tube 80 will be allowed to become grounded. The anode of tube 80 will become less positive than previously. This change will be coupled through capacitor 82 to the grid of tube 84 cutting off tube 84. The result is then that the anode of tube 84 becomes more positive and this change causes neon tube 86 to ignite and couple this positive going increase back to the grid of tube 80 maintaining it in a conducting condition even after strip 10 has passed the readout posts. Capacitor 82 then charges through resistor 88 until the grid of tube 84 becomes sufficiently positive for tube 84 to conduct. As this occurs tube 84 conducts and its anode becomes less positive and neon tube 86 extinguishes. Monostable multivibrator action of multivibrator 60 allows the circuit to maintain an indication for a predetermined period depending on the time constant of the R–C circuit consisting of capacitor 82 and resistor 88.

This is chosen for a desirable output independent of the time the strip may have remained in the reading position, normally a much shorter period. Multivibrator 60 serves the functions of a pulse amplifier and pulse stretcher. The anode rise of tube 84 during operation of the circuit is coupled through resistor 90 and neon tube 92 to output terminal 94 providing an output indication by the ignition of neon tube 92 and a voltage at terminal 94 to which an output load circuit would be connected. Neon tube 86 also thus serves as a visual indication that the circuit in which it is contained has detected the number it is assigned to detect.

FIGURE 3 illustrates in block form the same basic circuit as FIGURE 2 except that a selector switch 96 has been interposed between the digit sensing posts, or as illustrated here digit sensing means 98, and comparison circuit 102. For purposes of simplification the circuit has also been divided into two basic elements which will be termed detection circuit 100 and digit sensing means 98 and strip sensing means 104. Strip sensing means 104 comprises sensing posts 17 and 18 and these posts determine, as described above, when strip 10 is in position for reading. Digit sensing means 98 comprises the remainder of the sensing posts, posts 35, 37, 39, and 41. Selector switch 96 is of the ganged variety having as many positions, as for example 15, as there would be tape selections involved. Switch 96 functions as dictated by the circuit logic of FIGURE 2, to interconnect for a desired selection all sensing posts required to compose the desired number to "and" circuit 54 of comparison circuit 102. The remainder of the digit sensing posts are connected to "or" circuit 56 of the comparison circuit 102.

The operation of the circuit of FIGURE 3 is otherwise the same as the circuit of FIGURE 2. FIGURE 3 does add tape machine 106 which is driven by the positive output pulse 108 from multivibrator 60 of comparison circuit 102 when a digit has been detected. The pulse would be employed to stop tape machine 106. Instead of the pulse being fed directly to tape machine 106, an appropriate relay or other switching means may be interposed between comparison circuit 102 and tape machine 106, depending upon the control requirements of the tape machine.

FIGURE 4 illustrates an embodiment of the invention adapted to automatically stop tape machine 126 at each selected number on a tape and to pass over those that are not selected. A comparison circuit 102 is employed for each selection desired, that is assuming a fifteen selection circuit and a desired capability to select and stop a tape machine progressively at any one of the selections, fifteen such comparison circuits 102 would be employed. Each would be interconnected with strip sensing means 104 and digit sensing means 98 in accordance with the scheme already discussed. The output of each comparison circuit, and these circuits are labeled 102–1, 102–2, 102–3, etc., to indicate the coding to which they respond, is coupled to "stop-fast forward or reject" switch 110 which comprises a single-pole, double-throw switch for each comparison circuit, or in this case a total of 15 such switches. These outputs, which represent inputs to switch 110, are individually connected to the leaf member, or movable arm, of one of these switches of switch 110. As illustrated in FIGURE 5 showing a portion of switch 110, that is three sections of it, an input from comparison circuit 102–1 is coupled to terminal 112, an output of comparison circuit 102–2 to terminal 114 and the output of comparison circuit 101–3 to terminal 116.

As will be observed, terminals 112, 114 and 116 are the leaf terminals or movable arms of switch 110, and all like fixed contacts are connected together. Assuming that the left position of one of the switch elements is designated as a reject position and the right contact of each switch element is designated as a stop position then all selected outputs from comparison circuit 102 are connected together to the right switch terminals or conductor 118, and all rejected outputs are connected to the left switch terminals or conductor 120. Conductor 118 provides stop signals to stop relay 122 and conductor 120 provides "fast forward" signals to fast forward relay 124. Relays 122 and 124 provide tape machine 126 with either a closed circuit or an open circuit input as required to produce "stop" and "fast forward" functions.

Figures 6, 8:
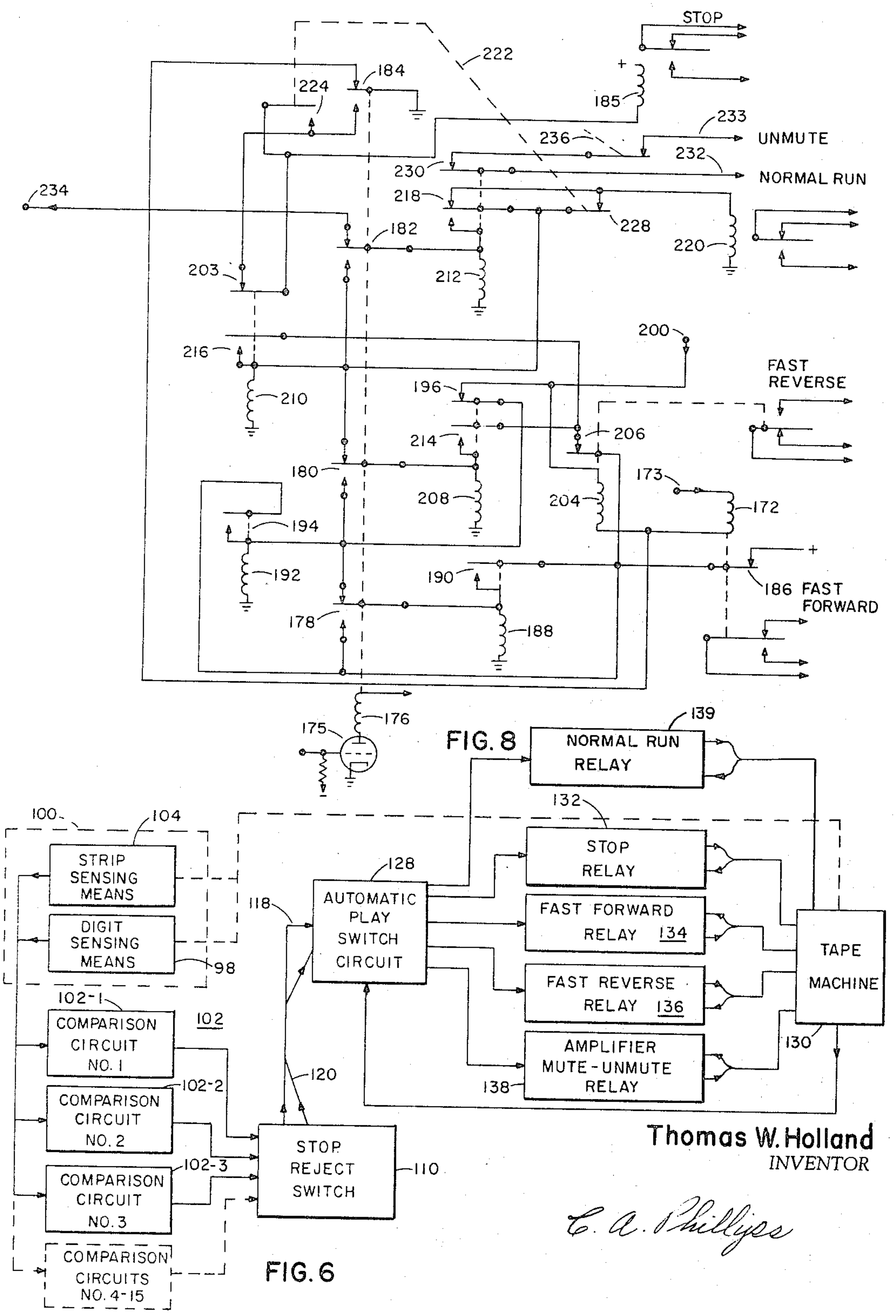
FIGURE 6 is a block diagram of still another embodiment of the invention wherein automatic play and control circuitry is added to the system shown in FIGURE 5.
FIGURE 8 is a schematic circuit diagram of a feature of the invention enabling precise location and automatic playback of recorded information approximately located by means illustrated in the other figures.

FIGURE 6 illustrates a variation of the embodiment of the invention set forth in FIGURES 4 and 5 as an automatic play switch circuit 128 is incorporated to enable selections not only to be automatically located but to be automatically played. Automatic playing requires that the tape machine cause the tape to be running in the forward direction at playing speed as the beginning of a selection reaches the playback head of the tape machine, and the playback amplifier be caused to be unmuted at this point and not before. With the locating and stop circuitry discussed thus far, a tape recorder is fed a stop signal when a desired number or selection is located on the tape. This number would be affixed to the tape in the form of strip 10 at the beginning of the selected musical selection or other bit of recorded information. Due to the inertia of tape transport systems the tape will run past the precise point of the beginning of the strip before the tape stops.

Therefore to automatically play a tape under these conditions it is necessary to run the tape back to the coded strip before commencing playback. Again some inertia is involved and the machine will cause the tape to overshoot the mark and stop at a point prior to the strip. Now of course by starting the machine to run at playing speed in the forward direction we are assured that we will hear the selection from the beginning. A difficulty here is that we will also hear the last of the prior selection. Thus what is desired during the total process between selections is that the playback amplifier be muted, that is that it be muted from the end of a prior selection until the tape is brought to normal play speed and the precise point of beginning of the next selection is reached, indicated by passing the strip again.

Automatic play switch circuit 128 accomplishes the foregoing functions and is shown in detail in FIGURE 8. Assume that initially tape machine 130 is manually set in a fast forward mode. It would run until the first selection is reached as determined by the first comparison circuit 102 which stop-reject switch is set to respond with a "stop" output. If this were selection No. 3 the stop output would be transmitted to automatic play switch circuit 128 when a strip 10 coded with the digit 3 is sensed by detection circuit 100. Upon receiving the initial fast forward signal, as from tape machine 130, switch circuit 128 is conditioned to perform the full sequence of steps necessary for automatic play of tape machine 130, through appropriate commands to stop relay 132, fast forward relay 134, fast reverse relay 136 normal run relay 139, and amplifier mute-unmute relay 138, these relays being connected to control the indicated functions of tape machine 130.

The system of switching is such that switch circuit 128 remembers the last function which occurred and performs the next indicated one upon receiving a signal from stop-reject switch 110. Thus instead of performing the full sequence as just indicated where the last function was fast forward, let us assume for example, that succeeding selections are selected. In this instance, at the end of the first selection, the tape machine would be running at normal running speed in the forward direction and the amplifier unmuted. Thus no new function is called for to play the next selection and the switch circuit aware of the last function performed which, prior to amplifier unmute, was normal run speed gives the next logical command, which is an amplifier unmute command. Since of course the amplifier is already unmuted this makes no changes in operation of tape machine 130.

Figure 7:
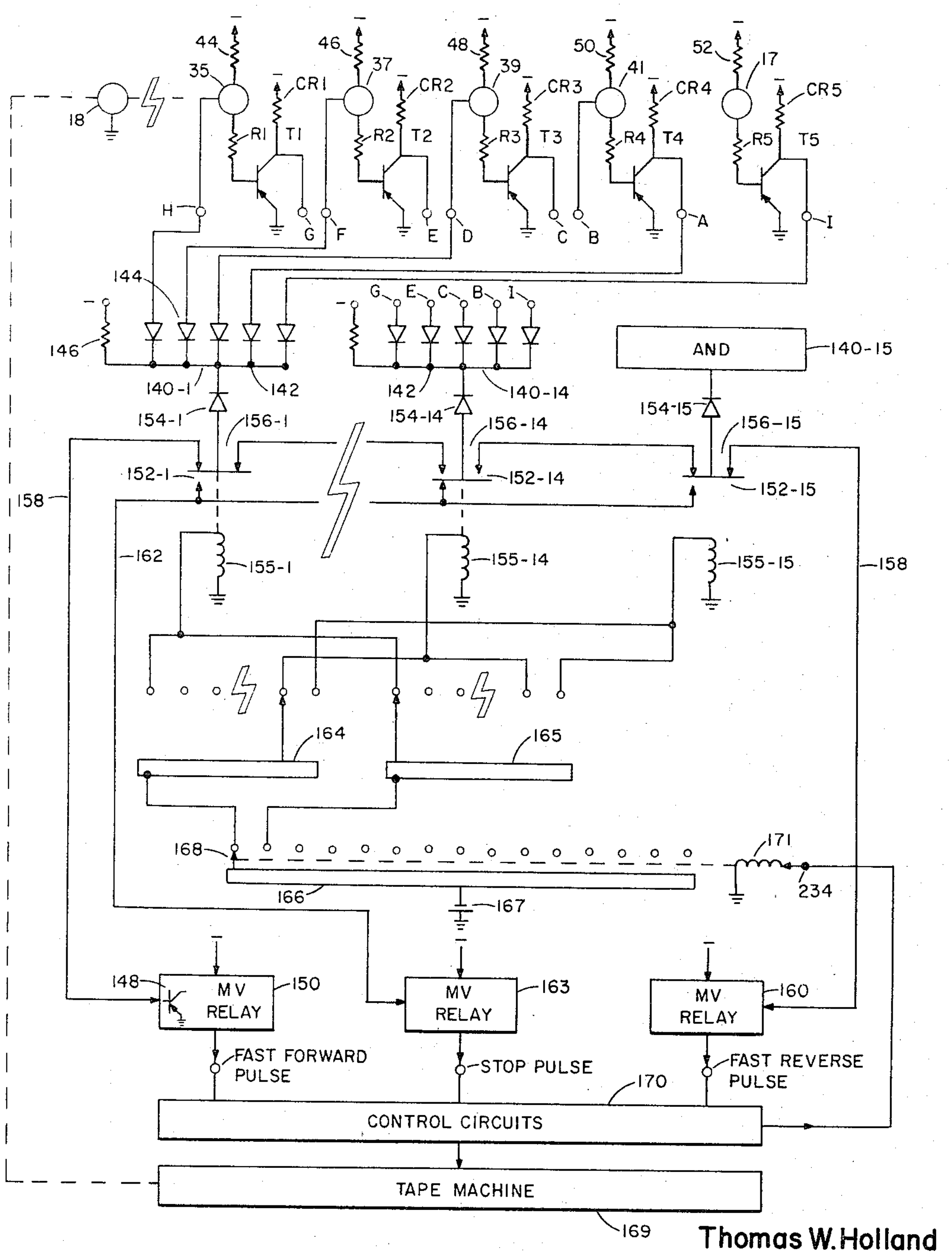
FIGURE 7 is a schematic circuit diagram of still another embodiment of the invention, it featuring automatic selection of random positioned recorded information.

FIGURE 7 shows still another embodiment of the invention. This embodiment provides circuit means for random selection of recorded material. It allows, for example, the selection in reverse order of selections.

As in the case of the other embodiments of the invention strip or strip position sensing is accomplished by posts 17 and 18 and digit sensing by posts 35, 37, 39, and 41. At this point there is a departure in that binary "one" indications are inverted outputs of the sensing posts and binary zero indications are direct outputs. Inversion is provided by grounded emitter transistor stages employing transistors T1–T5, one being associated with each digit sensing post and strip sensing post 17. They are interconnected by base resistors R1–R5. Negative collector bias is furnished each transistor through collector resistors CR1–CR5. Terminals A through I provide the direct and inverted outputs which are employed for decoding with A, C, E and G representative of digits 1, 2, 4 and 8 respectively and B, D, F and H respectively, representing the absence of these digits.

The I terminal is the inverted output of strip sensing post 17.

Digit comparison is accomplished by means of "and" circuits, and assuming 15 selections on a tape, 15 such circuits are employed, three of which "and" circuits, 140–1, 140–14 and 140–15, representative of "and" circuits responsive to the first, fourteenth and fifteenth are illustrated. Inasmuch as direct and inverted outputs are available from terminals A–H "or" circuits and further inversion means (as employed in FIGURE 2) are unnecessary for digit comparison and recognition. As is illustrated in the interconnection of "and" circuit 140–1 and 140–14 the logical system of interconnection employed is to connect to a given "and" circuit inverted inputs representative of digits which add up to the digit to be recognized, and also connect direct inputs representative of the digits which are omitted in the summation. This achieves the desired logic which indicates that all digits are accounted for and that only those digits which positively add up to the desired digits are represented in the summation. In the case of the "and" circuit 140–1, which is employed to detect a strip 10 coded with the digit one, the digital inputs are from terminal A (for the digit 1), terminals D, F, and H provide only zeros, and I indicate that strip 10 is properly aligned for reading. In a similar manner, inputs are connected to "and" circuit 140–14 representative of the digit 14 and to "and" circuit 140–15 representative of the digit 15.

Without an appropriate input to each of the inputs of a given "and" circuit the common cathode terminal 142 of each such circuit will be at near ground potential. This arises since if any one of the input terminals is at such potential, indicating a non-gating input, the particular in-circuit diode 144 of that "and" circuit will conduct in view of the common cathode negative bias applied through common cathode resistor 146 and bring all cathodes to the near ground potential.

A signal output is provoked in the circuitry following an "and" circuit when all inputs are negative. The subsequent circuitry includes in each instance a path commencing at ground potential, as illustrated by the grounded emitter of transistor 148 which is the input transistor (balance of circiut not shown) of a conventional monostable multivibrator relay circuit 150. Multivibrator relay circuit 150 employs a relay in the output of its first stage to provide a position output from the circuit when the first stage or input is pulsed.

With a negative input to the anodes of diodes 144 of "and" gate 140–1, a negative potential will appear on terminal 142 during this input and current will flow from ground through movable switch contacts 152–1 and isolating diode 154–1. Such an input will occur for the instant that tape 10 is properly aligned with the sensing posts, and of course, has the proper coding.

The circuit thus far described provided means for furnishing outputs at fiteen output points which may be treated as being movable contacts 152–1 through 152–15. This arrangement follows the arrangement of recorded selections upon the tapes with which the system is to be used and thus the first selection upon a tape would be coded with a one; it would gate "and" circuit 140–1 and an output pulse would appear on movable contacts 152–1. The same arrangement exists for the balance of the numbered selections, "and" circuits or gates, and movable contacts.

The circuitry subsequent to "and" circuits 140 of FIGURE 7 is devoted to the actual system of providing means for causing a tape machine to locate any one of the fifteen selections in any order and to by-pass all non-selected ones. This is done through a novel switching arrangement which provides appropriate distribution of outputs from the "and" circuits to the appropriate output control circuits of which there are three.

One of which, circuit 150, is briefly described above. They are alike, and each comprises a monostable multivibrator and relay wherein the relay is in the collector circuit of the first stage of the multivibrator. The essential factor, as to this control circuit, is that the input in each instance be compatible with the "and" circuit and that the function of providing an output pulse of sufficient duration to operate subsequent control circuit be met. It performs a pulse stretching function to assure more reliable operation.

Switch contacts 152–1 through 152–15 are controlled by a like series of relay coils 155–1 through 155–15 with the switch contacts being normally in an upper position, the position they occupy when their associated coil is unenergized. In their upper position these switch contacts bridge a like series of electrical gaps 156–1 through 156–15 in electrical conductor 158, which connects at one end (the first digit end) to multivibrator controlled relay circuit 150, which serves to provide a "fast forward" sense output. The other end (the last digit end) serves to provide a "reverse" sense output to like multivibrator controlled relay circuit 160. When one of relay coils 155 is energized it pulls its associated contacts 152 into contact with conductor 162 which is connected to the input of a third like multivibrator controlled relay circuit 163 which serves to provide a "stop" sense output.

Tape selections to be located are made on selector switches, two of which, switch 164 and switch 165 are shown. There may be as many of these switches as desired which may be more or less than the number of selections on a tape. Having more allows for a repeat capability. Each of the selector switches has a common terminal with a moving contact and fifteen fixed contacts, a fixed contact being connected to one terminal of one of coils 155–1 through 155–15. The remaining terminal of each coil 155 is returned to ground.

The order of play of selections indicated on the selector switches is controlled by a switch which as shown is an electrically controlled stepping switch 166. Switch 166, although shown with contacts in a line for convenience of illustration, would normally be circular and stepping relay coil 171 would cause movable contact 168 to be continuously movable in one direction permitting reset of switch 166 at the last selector switch position. There would be one stepping selector switch position for each selector switch, and interconnecting would be from a fixed contact on switch 166 to a movable contact on one of the selector switches. Movable contact 168 of switch 166 is connected to a negative source of voltage.

Considering the direction of travel of movable contact 168 as controlled by relay coil 171, order of play depends upon the order in which the selector switches are connected. As illustrated, assuming a left to right travel (or clockwise for circular travel) of movable contact 168, the selection on selector switch 165 would be played second.

Assumed that it is desired to locate as a first selection the fourteenth selection appearing on a tape and as a second selection, selection one on the tape. The number fourteen selection is selected on switch 164 and the number one selection is selected on switch 165, to commence operation. As switch 166 is in the first position, a circuit will be completed from the negative terminal of source 167 through switch 166, selector switch 164 and coil 155–14 to ground.

The result will be that contacts 152–14 will be pulled down to contact conductor 162. Next, tape machine 169 with which the circuit is connected would be manually or automatically switches to a "fast forward" mode of operation through control circuit 170. As strips 10 on tape 12 travel past sensing posts 17 and 18, pulses will be applied to conductor 158 as coincidence occurs between coded strips and "and" circuits. This occurs as coded strips one through thirteen pass. As will be noted, these pulses are fed only through conductor 158 to the left down to circuit 150 as there is a gap at gap position 156–14. Since tape machine 169 is already in a fast forward mode the inputs to circuit 150, which functions to trigger fast forward operation, do not affect operation. When, however, a strip coded with the digit 14 appears, "and" circuit 140–14 is gated and a pulse is applied through contacts 152–14 to conductor 162. This provides an input to monostable multivibrator controlled relay circuit 163 which is thereby triggered and a "stop" pulse is provided control circuit 170 which causes tape machine 169 to stop. Selection fourteen would then be played, either manually or automatically as will be discussed in the description of FIGURE 8. During the time that selection 14 is being played switch 166 is moved or stepped to the next selection, and assuming that the next desired selection is set by switch 165, set to locate selection number one, when movable contact 168 is stepped to the second position, coil 155–1 will be energized and contacts 152–1 will be pulled down in contact with conductor 162. Coil 155–14 will have released contacts 152–14 by this time and these contacts will have returned to their upper position bridging gap 156–14. At the end of play of selection fourteen the coded strip marking the beginning of selection fifteen will contact the sensing posts and a pulse will be sent from "and" circuit 140–15 through contact 152–15 to conductor 158.

With a gap in conductor 158 at the point where contacts 152–1 are pulled down the only current path is through the input of relay circuit 160 which is energized to provide a "reverse" output signal. Tape machine 169 is then reversed and the tape runs until the beginning of selection one is reached and strip 10 coded for the digit one is sensed and a stop output pulse through contacts 152–1 and conductor 162 applied to "stop" relay circuit 163. Circuit 163 in turn supplies a stop signal through control circuit 170 to tape machine 169 which is thereby stopped. Control circuit 170 may be a part of tape machine 169 or special circuitry, as for example part or all the automatic control circuitry illustrated by FIGURE 8.

FIGURE 8 illustrates the stopping, precision locating and automatic playing circuitry which is adapted for use with the previously discussed locating systems. It has particular application in the systems of FIGURES 6 and 7 and is broadly discussed in the description of automatic-play switch circuit 128 of FIGURE 6. A complete cycle of the circuit shown in FIGURE 8 is required when the associated tape machine with which it is employed is initially in a condition of "fast forward" and coil 172 has been pulsed to thereby condition the circuit for a full cycle, e.g., all holding relays released. A pulse input to terminal 173, as from relay circuit 150 of FIGURE 7, triggers relay 172. "Fast forward" operation would be triggered in an associated tape machine by a pulse applied at terminal 173 which would energize relay 172 which provides a selection of either normally closed or normally open input contacts for control of the tape machine. In this mode the input grid of tube 175 will receive three positive pulses, each one lasting several seconds as controlled by the time constant of multivibrator circuit 60 in FIGURE 2, or multivibrator relay control circuit 163 of FIGURE 7.

As the first positive pulse arrives at the grid of tube 175, marking that a selection has been located, relay 176 is energized, operating contacts 178, 180, 182 and 184 downward. Contacts 184 operate the stop circuitry of the tape machine by energizing relay 185 having a choice of normally open or normally closed input contacts for such tape machine. Contacts 184 also remove the ground return from fast forward relay 172 and "fast reverse" relay 204 giving the stop function priority. The leaf of contacts 178 moves to the lower contact passing the positive potential applied to the fixed terminal of normally closed contacts 186 from contacts 186 through contacts 178 energizing relay 188. Relay 188 closes contacts 190 holding relay 188 energizes after relay 176 deenergizes. At the end of the first stop pulse, contacts 178, 180, 182 and 184 return to their upper position. Positive potential is passed through contacts 190 through the leaf of contacts 178 to the upper contact of 178. This energizes relay 192 closing holding contacts 194. A positive potential is now passed through normally closed contacts 196 to fast reverse relay 204 which provides either a normally open or normally closed set of tape machine input contacts. The tape having overrun the beginning of a selection as previously discussed is thus sent back.

If the tape machine had been initially operating in a fast reverse mode and a pulse to this effect had been transmitted to terminal 200, as from relay circuit 160 of FIGURE 7, this first step would not have occurred and the condition for the next step in the cycle would have been set, that being a positive voltage on the lower contact of contacts 180. This would have been accomplished by the pulse from terminal 200 through normally closed contacts 196. Relay 204 functions in the instance of externally operated reverse and associated contacts 206 remove the positive potential from relays 208, 210, and 212 which may be holding them energized through holding contacts 214, 216, and 218.

This will deenergize these relays so that they will perform the correct functions during stop pulses.

When the second (or first if initial condition was reverse) stop pulse arrives at the grid of tube 175, relay 176 energizes the second time. Contacts 178, 180, 182, and 184 again operate. Contacts 184 operate the stop circuits in the tape machine. Contacts 178 perform no function during this part of the sequence as both contacts are at the same potential. However, the leaf of contact 180 passes the positive potential from energized contacts 194 through contacts 180 to relay 208. This closes contacts 214 and opens contacts 196. Contacts 196 remove the potential from relay 204. As relay 204 is deenergized, contacts 206 close passing positive potential through contacts 206 and energize contacts 214 holding relay 208 energized. At the end of the second stop pulse relay 176 again de-energizes and its contacts return to the normal condition. Leaf 180 passes the positive potential from contacts 206 and 214 to relay 210 energizing holding contacts 216. The positive potential is now passed through contacts 218 to the normal run relay 220 to provide normally open or closed relay contacts for tape machine input. This thus signals the tape machine to commence running in the forward direction and occurs just ahead of the beginning of a tape selection.

In addition to energizing "run" relay 220 the second stop pulse conditions the circuit for the next circuit function which is unmute the amplifier of the associated tape machine. To accomplish this, relay 210 opens contacts 203 opening the ground connection to stop relay 185 and closes contacts 216 applying a hold voltage to the lower of contacts 182.

The open circuit to "stop" relay 185 prevents contacts 184 from sending a stop signal to relay 185 upon the next "stop" pulse as no stop is necessary, only unmuting of the output of the tape machine amplifier. However, to accomplish a stop, if one is desired at this point, "pause" switch 222 with normally open contacts 224, and normally closed contact 228, conditions the circuit to allow a stop pulse to relay 185 and prevents a "run" output upon a receipt of another pulse. This causes the tape machine to stop. The closing of contacts 224 permits the stop pulse to relay 185 and the opening of contacts 228 prevents the tape machine from automatically returning to the normal run condition after the completion of the next pulse, as contacts 218 will be in a lower position. Switch 222 is shown in a non-pause mode.

With the circuit conditioned as thus described with a holding potential on a lower of contacts 182, the receipt of a stop pulse at the grid of the tube 175 energizes relay 176 for the third time (assuming a full sequence), operating all of its contacts. The movable leaf of contacts 182 now passes a positive potential from contact 182 to relay 212. Relay 212 energizes and the movable arm of contacts 218 is pulled down to hold relay 212 energized after contacts 182 are released. Contacts 230 now open to open amplifier terminals 232 and 233 which otherwise would short the sound output of the tape machine amplifier. This occurs coincident with strip 10 provided an input upon reaching the sensing posts moving in the proper direction for play. Thus sound output starts at the precise beginning of a selection.

When relay contacts 178, 180, 182, and 184 return to their deenergized position at the end of the last mentioned stop pulse, the leaf of contacts 182 passes the positive potential to output terminal 234 which would be connected to coil 171 of stepping switch 166 of FIGURE 7.

If two consecutive numbers are chosen in succession (e.g. musical selections three and four on a tape), the circuit will be conditioned to produce no changes other than interrupt and then close the circuit supplying power to terminal 234. Thus this will only advance stepping switch 166 of FIGURE 7 (and stop if pause is operated). For the other circuits shown this output to terminal 234 has no function. Manual "unmute" switch 236 permits unmuting the tape machine amplifier in all portions of the locating cycle.

When the tape machine is again placed in fast forward operation, relay 172 energizes and contacts 186 open to open other energized relays to condition the circuit for another complete cycle.

When the machine is placed in a fast reverse condition and thus a pulse received at terminal 200, relay 204 is energized and contacts 206 open to deenergize relays 208, 210 and 212 to condition the circuit for one step (the first one) less than a complete cycle. In the event that there had not been previously a fast forward condition, by deenergizing relay 208, contacts 196 close allowing positive potential from terminal 200 to be passed through contacts 196 to relay 192 and through contacts 178 to relay 188 energizing them and thereby conditioning the circuit to commence its cycle after reverse and thus be completed by only two "stop" pulses. The amplifier output is always muted whenever any part of the cycle is in progress unless it is manually unmuted by switch 236.

Although the invention has been described in connection with particular embodiments, it will be understood that changes may readily be made in this structure and in the combination of circuitry illustrated without departing from the spirit and scope of the invention.

I claim:

1. A locating system for a tape playback machine comprising:

(A) A plurality of spaced conductive posts positioned to engage a strip of tape, said posts being of uniform spacing except that one end post and an adjacent post are spaced closer than the spacing between other posts and one end post being connected to an electrical common point and the other end post being connected through electrical resistance to a negative voltage source;

(B) A source of negative voltage connected to each of the other posts, the non-end posts, through separate electrical resistance;

(C) An electrical "or" type circuit comprising a plurality of diodes, the cathodes of which are connected to a common output terminal and the anodes of each said diode being connected to a selected said post;

(D) An electrical inverter circuit responsive to said output of said "or" circuit for providing an inverter output which is the inverse of the output of said "or" circuit;

(E) An electrical "and" type circuit comprising a plurality of diodes, the anodes of which are connected to a common output terminal, cathode of one of said diodes being connected to said other end post, the cathode of another of said diodes being connected to said inverter output and the remaining cathodes being connected, respectively to posts which are not connected to said "or" circuit;

(F) A monostable multivibrator, the input of which is connected to the common output terminal of said "and" type circuit and the output of which provides an ouput control signal in response to appropriate conductive contact between selected of said posts.

2. The system set forth in claim 1, wherein said electrical inverter includes neon bulb insolation coupling between said "and" type circuit and said multivibrator includes neon bulb regenerative coupling.

3. A locating system for a tape playback machine comprising:

(A) A conductive tape sensing means comprising a pair of spaced conductive posts positioned to engage a surface of flexible tape;

(B) Digit sensing means comprising a plurality of spaced conductive posts positioned to define a tape path between said pair of conductive posts; and (C) Comparison means comprising an "and" type circuit and an "or" type circuit for providing a logical output wherein:

(1) said "or" type circuit is responsive to an electrical input from selected of the posts of said digit sensing means, (2) said "and" type circuit is responsive to:

(a) an electrical input through said pair of conductive posts;

(b) an electrical input from said "or" type circuit; and (c) electrical inputs from those remaining conductive posts of said digit sensing means which do not provide an input to said "or" type circuit.

4. The system set forth in claim 3, further comprising a selector switch for selectively distributing the output of said digit sensing means between said "and" type circuit and said "or" circuit.

5. The system set forth in claim 3, comprising:

(A) A plurality of additional said comparison means wherein the distribution of outputs of said digit sensing means between said "and" type circuit and "or" circuit differs with each said comparison means;

(B) Switching means for combining on one or the other of two conductors the outputs of said comparison means;

(C) Means responsive to one of said two conductors for providing a first control discriptivesignal of a "fast forward" tape machine command; and (D) Means responsive to the other of said two conductors for providing a second signal descriptive of a "stop" tape machine command.

6. The system set forth in claim 5, further comprising a tape machine responsive to said first control signal for controlling said tape machine in "fast forward" and further comprising switching means responsive to said second control signal for sequentially:

(A) Providing a reverse control to said tape machine upon the occurrence of a said second control signal;

(B) Providing a normal forward run signal to said tape machine upon the second occurrence of said second control signal; and (C) Providing an amplifier unmuting signal to said tape machine upon the third occurrence of said second control signal.

7. A locating system for a tape machine comprising:

(A) a conductive tape sensing means comprising a pair of spaced conductive posts positioned to engage a surface of recording tape;

(B) a digit sensing means comprising a plurality of spaced conductive posts positioned to define a path between said pair of conductive posts;

(C) a plurality of comparison means each responsive to the completion of a first electrical path, being between said pair of conductive posts, and responsive to a selected combination of other electrical paths and non-paths between posts of said digit sensing means and said first path for providing an electrical signal representative of a digit and further comprising:

(1) A first electrical conductor having at a first end a first terminal point and at the other or second end a second terminal point and between said terminal points a like said plurality of electrical gaps, each one associated with one of said digit identified gaps increasing in digit value in order from said first terminal;

(2) A separate electrical bridging conductor electrically connected to the output of each comparison means and associated with a like digitally represented gap;

(3) A second electrical conductor;

(D) Control means associated with each of said bridging conductors for bridging its associated gap when said control means is unenergized and moving said bridging conductor into contact with said second conductor when said control means is energized;

(E) A plurality of selector switches, not limited by said first named plurality, each comprising means for connecting to the input of any one of said control means;

(F) Master switching means for applying an electrical input to said input of any one of said selector switches;

(G) First signal output means connected to said first terminal of said first conductor for electrically terminating said first terminal and providing a control output signal representative of a first control signal;

(H) Second signal output means connected to said second terminal of said first conductor for electrically terminating said second terminal and providing a control signal output representative of a second signal;

(I) Third signal output means connected to said second conductor for electrically terminating said second conductor and providing a control signal output representative of a third control signal.

8. The system set forth in claim 7, further comprising means for providing sequential switching outputs comprising:

(A) First switching means responsive to a signal representative of said first control singal for providing a first circuit conditioning output;

(B) Second switching means responsive to either a combination of said first circuit conditioning output and said third signal, or a signal representative of said second signal alone for providing a first switching output and second circuit conditioning output;

(C) Third switching means responsive to said second circuit conditioning output and a said third signal for providing a second switching output and a third circuit conditioning output;

(D) Fourth switching means responsive to said third circuit conditioning output and a said third signal for providing a third switching output;

(E) Fifth switching means responsive to a said third signal for providing a fourth switching output;

(F) Disabling means connected to said fifth switching means and responsive to said third circuit conditioning output for disabling said fifth switching means.

9. The system set forth in claim 8 wherein said master switching means includes means for providing a sequence of inputs to said selector switches.

10. The system set forth in claim 8 wherein said master switching means includes means for repeating said sequence at the conclusion of that sequence.

References Cited

UNITED STATES PATENTS

| | | | |
|---|---|---|---|
| 2,158,749 | 5/1939 | Elliott | 255—61.12 |
| 2,925,746 | 9/1960 | Sampson | 179—100.2 |
| 3,217,142 | 11/1965 | Lamm | 235—6.12 |
| 3,270,135 | 8/1966 | Scheffer et al. | 179—100.2 |

FOREIGN PATENTS 887,512 1/1962 Great Britain.

OTHER REFERENCES

Frequency-Code Telemetering System: H. B. Schulteis, Jr., "Electronic" magazine April, 1954, pp. 172–175.

TERRELL W. FEARS, *Primary Examiner.*

B. KONICK, *Examiner.*

V. P. CANNEY, *Assistant Examiner.*